(12) United States Patent
Xu et al.

(10) Patent No.: US 11,498,002 B2
(45) Date of Patent: Nov. 15, 2022

(54) METHOD AND SYSTEM OF GENERATING DATA AND TRAINING A MODEL, SERVER, AND TERMINAL DEVICE

(71) Applicant: Shanghai Bilibili Technology Co., Ltd., Shanghai (CN)

(72) Inventors: Sijia Xu, Shanghai (CN); Renjie Hu, Shanghai (CN); Yang Liu, Shanghai (CN); Huyang Sun, Shanghai (CN)

(73) Assignee: SHANGHAI BILBILI TECHNOLOGY CO., LTD., Shanghai (CN)

( * ) Notice: Subject to any disclaimer, the term of this patent is extended or adjusted under 35 U.S.C. 154(b) by 59 days.

(21) Appl. No.: 17/078,973

(22) Filed: Oct. 23, 2020

(65) Prior Publication Data
US 2021/0121780 A1    Apr. 29, 2021

(30) Foreign Application Priority Data

Oct. 25, 2019 (CN) .......................... 201911023192.7
Oct. 25, 2019 (CN) .......................... 201911023194.6

(51) Int. Cl.
*A63F 13/56* (2014.01)
*G06N 20/00* (2019.01)
*A63F 13/822* (2014.01)

(52) U.S. Cl.
CPC ............ *A63F 13/56* (2014.09); *A63F 13/822* (2014.09); *G06N 20/00* (2019.01)

(58) Field of Classification Search
None
See application file for complete search history.

(56) References Cited

U.S. PATENT DOCUMENTS 9,269,095 B1 *  2/2016  Chan ...................... G06N 20/00
2021/0295099 A1 *  9/2021  Huang ................. G06K 9/6201

OTHER PUBLICATIONS

Xu et al.; "Macro Action Selection with Deep Reinforcement Learning in StarCraft"; 15th AAAI Conf. on Artificial Intelligence and Interactive Digital Entertainment; vol. 15; 2019; p. 94-99.

* cited by examiner

*Primary Examiner* — Ronald Laneau
(74) *Attorney, Agent, or Firm* — BakerHostetler

(57) ABSTRACT

The present disclosure describes techniques for training a model and improving game performance using the model. The disclosed techniques comprise obtaining a plurality of sets of game data from a plurality of terminal devices, the plurality of sets of game data being stored in a plurality of segment replay buffers; sampling the plurality of sets of game data based on a predetermined priority and obtaining a sampling result; inputting the sampling result into a loss function and training a model by using a calculation result of the loss function; and determining a quality (Q) value of each action performed by a virtual object in a game run on a terminal device among the plurality of terminal devices by using the model.

20 Claims, 8 Drawing Sheets

METHOD AND SYSTEM OF GENERATING DATA AND TRAINING A MODEL, SERVER, AND TERMINAL DEVICE

CROSS-REFERENCE TO RELATED APPLICATION

The present application claims priority of Chinese patent application Nos. 201911023192.7 and 201911023194.6, filed on Oct. 25, 2019. The entire disclosure of the above-identified application is hereby incorporated by reference herein and made a part of this specification.

BACKGROUND

With the rapid development of computer technology, there are many applications with two-dimensional or three-dimensional virtual environments, that is, real-time strategy games, on terminals such as smart phones and tablet computers, wherein, StarCraft (SC) is one of the most popular and successful Real Time Strategy (RTS) games. In recent years, due to its huge state space, hidden information, and multi-agent collaboration, SC is considered as a test platform for artificial intelligence research. Due to the annual Artificial Intelligence and Interactive Digital Entertainment (AIIDE) and Computational Intelligence and Games (CIG) competitions, more and more artificial intelligence robots are proposed and continuously improved. However, a huge gap is still existed between top robots and professional human players.

SUMMARY

The purpose of the present invention is to provide a method, a server and a terminal device of training a model for solving the defects of insufficient training of the model and unsatisfactory improvement of robot performance due to the sparsity of rewards during a game in the prior art.

In one aspect of the present invention, a method of training a model is provided, the method including:

obtaining a plurality of game data from a plurality of terminal devices respectively;

taking a sample of the plurality of the game data according to a preset priority, and obtaining a sampling result;

inputting the sampling result into a preset loss function to train a model according to a calculation result of the loss function:

wherein, the plurality of the game data is stored in a replay buffer, the replay buffer includes a plurality of segment replay buffers, and the game data obtained from different terminal devices are stored in the segment replay buffer corresponding to the replay buffer.

Preferably, the method of training a model further includes:

synchronizing the model to the plurality of the terminal devices according to a training result of the model to make the plurality of the terminal devices input the obtained game data into the model to obtain a quality (Q) value of each action performed by a virtual object in the terminal devices.

Preferably, a formula of the loss function is specifically as follows:

$$l_t(\theta) = \frac{1}{2}(G_t - q(S_t, A_t, \theta))^2;$$

$$G_t = \lambda^n q\left(S_{t+n}, \underset{a}{\mathrm{argmax}}\, q(S_{t+n}, a, \theta), \theta^-\right);$$

wherein, $l_t(\theta)$ represents the loss function, $S_t$ represents a state at time t, $A_t$ represents an action at time t, $G_t$ represents target data when a game is not over, t represents a sampling time index beginning at the state $S_t$ and the action $A_t$, and $\theta$ represents a parameter used for an action selection, $\theta$ changes with training, n represents a number of actions performed, $\lambda$ is a constant, and $0<\lambda<1$, $S_{t+n}$ represents the state after n actions are performed after the time t, and $\alpha$ represents the action performed, $\theta^-$ represents the parameter copied from $\theta$ by cycle.

In order to achieve the above objective, the present invention also provides a method of training a model applied to a terminal device, the method including:

obtaining model information synchronized by a server, and game data in a game state and target data in a non-game state of the terminal device, wherein the game data comprises at least a state of a virtual environment when the terminal device is in the game state, the target data comprises at least an over state of the virtual environment when the terminal device is in the non-game state, an action in the non-game state, and a target reward value obtained after performing the action in the non-game state:

inputting the game data into the model to obtain a Q value of each action performed by a virtual object in the terminal device from the model;

determining the action performed by the virtual object in the terminal device according to a preset exploration degree and the Q value to make the virtual object perform the action, and obtaining a corresponding reward estimated value and the state of the virtual environment, wherein the exploration degree represents a credibility of performing the action corresponding to a maximum value of the Q value;

sending the action, the reward estimated value, the state, and the target data to the server, and storing the action, the reward estimated value, the state, and the target data in a segment replay buffer corresponding to a preset replay buffer, for the server to train and update the model.

Preferably, the obtaining a target data in a non-game state includes:

when in the non-game state, respectively obtaining scores of other terminal devices having a confrontational relationship with the terminal device and a score of the terminal device, wherein the score comprises at least a construction score, an arms score, and an economic score;

calculating the target reward value of the terminal device according to the score of the other terminal devices and the score of the terminal device.

Preferably, a formula for calculating the target reward value of the terminal device is:

$$r_{new} = \gamma^{timedecay} \frac{S_{our} - S_{enemy}}{\max(S_{our}, S_{enemy})};$$

wherein, the $r_{new}$ represents the reward value of the terminal device, the timedecay represents a game duration, γ is a constant, and 0<γ<1, the γ^{timedecay} represents the longer the time, the smaller the value of the constant, and the $S_{our}$ represents the score of the terminal device, and the $S_{enemy}$ represents the score of the other terminal device.

Preferably, both the terminal device and the other terminal devices are numbered, and a calculation formula for the exploration degree is:

$$\epsilon_i = \epsilon^{1+\frac{i}{N-1}\alpha};$$

wherein, the $\epsilon$, $\alpha$, and N are constants, and i represents a number of the terminal device, and the larger the number of the terminal device is, the higher the exploration degree is; when the exploration degree is higher, it represents a probability of performing the action corresponding to the highest value of the Q value is lower; when the exploration degree is lower, it represents the probability of performing the action corresponding to the highest value of the Q value is higher.

Preferably, the method further includes:

performing a distributed deployment of the terminal device and the other terminal devices, and establishing communication connections between the terminal device, the other terminal devices, and the server;

setting the exploration degree for the terminal device and the other terminal devices according to the formula for the exploration degree.

In order to achieve the above objective, the present invention also provides a server, the server specifically including the following components:

an obtaining module, obtaining a plurality of game data from a plurality of terminal devices respectively;

a sampling module, taking a sample of the plurality of the game data according to a preset priority, and obtaining a sampling result;

a training module, inputting the sampling result into a preset loss function to train a model according to a calculation result of the loss function;

wherein, the plurality of the game data is stored in a replay buffer, the replay buffer includes a plurality of segment replay buffers, and the game data obtained from different terminal devices are stored in the segment replay buffers corresponding to the replay buffer.

In order to achieve the above objective, the present invention also provides a terminal device, which specifically including the following components:

an obtaining module, obtaining model information synchronized by a server, and game data in a game state and target data in a non-game state of the terminal device, wherein the game data includes at least a state of a virtual environment when the terminal device is in the game state, the target data comprises at least an over state of the virtual environment when the terminal device is in the non-game state, an action in the non-game state, and a target reward value obtained after performing the action in the non-game state;

a processing module, inputting the game data into the model to obtain a Q value of each action performed by a virtual object in the terminal device from the model;

a determining module, determining the action performed by the virtual object in the terminal device according to a preset exploration degree and the Q value to make the virtual object perform the action, and obtaining a corresponding reward estimated value and the state of the virtual environment, wherein the exploration degree represents a credibility of performing the action corresponding to a maximum value of the Q value;

a sending module, sending the action, the reward estimated value, the state, and the target data to the server, and storing the action, the reward estimated value, the state, and the target data in a segment replay buffer corresponding to a preset replay buffer, for the server to train and update the model.

In order to achieve the above objective, the present invention also provides a computing device, which comprises a memory, a processor, and computer programs that stored in the memory and operable on the processor, when the processor executes the computer programs, the steps of method of training a model described above are realized.

In order to achieve the above objective, the present invention also provides a computer-readable storage medium, which stores computer programs that upon, when the computer programs are executed by a processor, the steps of method of training a model described above are realized.

The method, server and terminal device of training a model, computing device and readable storage medium provided by the present invention, obtains game data in a game state and target data in a non-game state from a plurality of terminal devices, takes a sample of the game data and the target data according to a preset priority, and inputs a sampling result into a loss function to train a model, so as to achieve an effect of fully training the model in the case of sparse rewards, greatly improve a robot performance.

BRIEF DESCRIPTION OF THE DRAWINGS

By reading the detailed description of the preferred embodiments below, various other advantages and benefits will become clear to those of ordinary skill in the art. The drawings are only used for the purpose of illustrating the preferred embodiments, and are not considered as a limitation to the present application. And, throughout the drawings, the same reference symbols are used to denote the same components. In the drawings.

DETAILED DESCRIPTION OF ILLUSTRATIVE EMBODIMENTS

Figure 1:
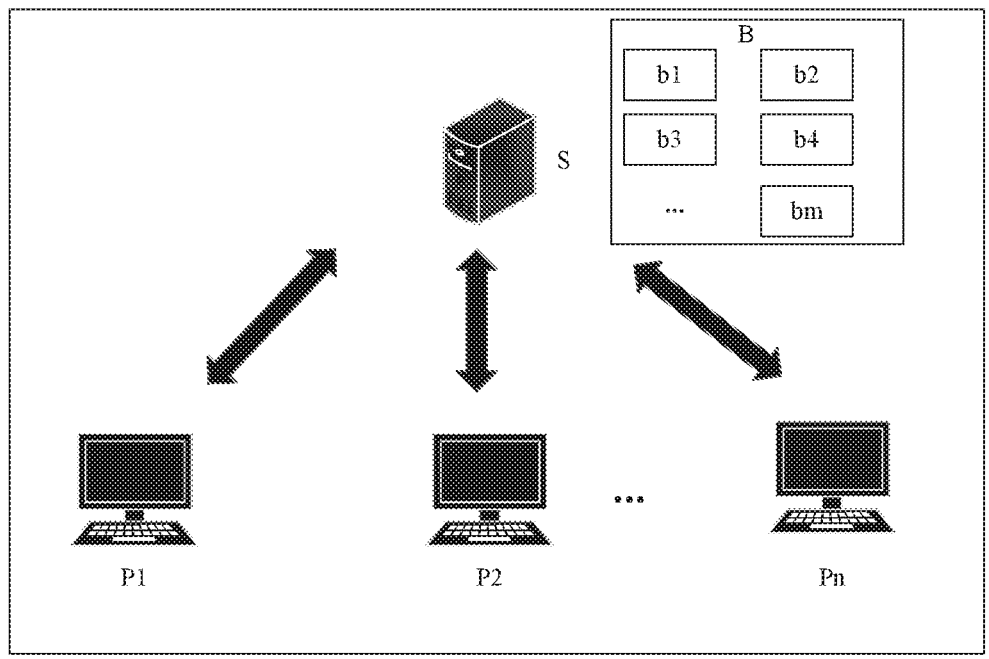
FIG. 1 illustrates an optional diagram of an application environment of a method of training a model according to an embodiment of the present disclosure.

In order to make objectives, technical solutions and advantages of the present invention more clear, the present invention will be further described in detail below in conjunction with accompanying drawings and embodiments. It should be understood that the specific embodiments described herein are only used to explain the present invention and are not intended to limit the present invention. Based on the embodiments of the present invention, all other embodiments obtained by those of ordinary skilled in the art without making creative efforts fall within the protection scope of the present invention.

With the development of Deep Reinforcement Learning (DRL), a DRL framework is used to perform a macro action in the SC. The so-called macro action refers to the strategic level actions when competing with opponents in a game, such as producing, constructing, and updating. Through a feedback learning of the data generated during a game, and what kind of action sequence will lead to a final reward is distinguished. However, during the game, positive or negative rewards are usually obtained after performing a plurality of actions, the sparsity of the reward leads to insufficient training of the model and unsatisfactory improvement of robot performance. During the game, due to a fog caused by a war on a map, current partial observations are not enough to infer the future state and rewards, and a correct macro action selection cannot be made.

Part of glossary explanation:

Virtual environment: it is a virtual environment displayed (or provided) when an application is running on a terminal. The virtual environment can be a simulation environment of the real world, a semi-simulated and semi-fictional three-dimensional environment, or a purely fictitious three-dimensional environment. The virtual environment can be any one of a two-dimensional virtual environment, a 2.5-dimensional virtual environment, and a three-dimensional virtual environment. Optionally, the virtual environment is also used for a virtual environment battle between at least two virtual characters, and the virtual environment has virtual resources available for the at least two virtual characters. Optionally, a map of the virtual environment is square or rectangle, and the square or rectangle includes a symmetrical lower left corner area and an upper right corner area; the victory conditions of the battle in the virtual environment include occupying or destroying a target stronghold of an enemy camp, and the target stronghold can be all strongholds of the enemy camp, or part of the strongholds of the enemy camp (such as a main base and a defensive tower).

Virtual object: refers to a movable object in the virtual environment. The movable object can be at least one of a virtual character, a virtual animal, and an animation character. Optionally, when the virtual environment is the three-dimensional virtual environment, the virtual object is a three-dimensional model, and each virtual object has its own shape and volume in the three-dimensional virtual environment and occupies a part of space in the three-dimensional virtual environment. Taking a game of StarCraft (SC) as an example, the virtual object can be any race of the Zerg, Terran, and Protoss in the game of the SC. In the embodiment of the present invention, the Terran is taken as an example of the target virtual object for description.

Reward value: it is an overall contribution of the virtual object's scheduling strategy and/or behavior to a victory condition. The contribution of the virtual object's behavior to the victory condition is an instant income, and the contribution of the virtual object's scheduling strategy to the victory condition is a return income. For example, the virtual object is defending in an area A, and the behavior of the virtual object is to attack the virtual animal, the contribution of an increased experience value caused by attacking the virtual animal to the victory condition is the instant income of a virtual object A: a user controls the virtual object to perform a large-scale transfer, transferring from the area A to an area B, to conduct local battles with virtual objects of the enemy camp, and the contribution of the virtual object to the victory condition by killing the virtual object of the enemy camp is the return income. FIG. 1 illustrates an optional diagram of an application environment of a method of training a model according to an embodiment of the present invention. A server S in FIG. 1 communicates with a plurality of terminal devices P1, P2 . . . Pn. The plurality of the terminal devices P1, P2 . . . Pn can be various electronic display devices such as notebook computers, desktop computers, mobile phones, and tablet computers. The server S receives game data uploaded by the plurality of the terminal devices P1, P2 . . . Pn, trains and updates a model according to the game data, and then synchronizes the trained and updated model to the plurality of the terminals devices P1, P2 . . . Pn. The plurality of the terminal devices P1, P2 . . . Pn are all installed with Real Time Strategy (RTS) games, receive the model synchronized by the server S, and use the model to generate new game data, so that the server S further trains and updates the model. It should be noted that the server S is provided with a replay buffer B, and the replay buffer B is provided with a plurality of segment replay buffers b1, b2, b3, b4 . . . bm for storing the game data uploaded by the plurality of the terminal devices P1, P2 . . . Pn. In the embodiment of the present invention, a game of the SC is taken as an example for description.

The method of training a model provided in the embodiment of the present invention will be described below with reference to the accompanying drawings.

Figure 2:
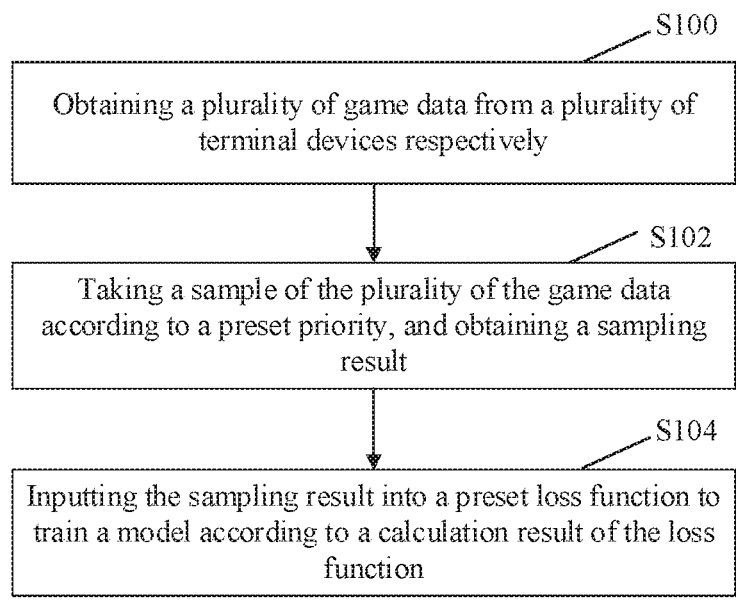
FIG. 2 illustrates an optional flowchart of the method of training a model according to an embodiment of the present disclosure.

FIG. 2 is an optional flowchart of a method of training a model according to an embodiment of the present invention, which is applied to the server. As shown in FIG. 2, the method specifically includes the following steps:

Step S100, obtaining a plurality of game data from a plurality of terminal devices respectively, wherein, the plurality of the game data is stored in a replay buffer, the replay buffer includes a plurality of segment replay buffers, and the game data obtained from different terminal devices are stored in the segment replay buffers corresponding to the replay buffer.

Exemplarily, with reference to FIG. 1, when the plurality of the game data are respectively obtained from the plurality of the terminal devices P1, P2 . . . Pn, the plurality of the data are stored in the segment replay buffers of the replay buffer according to the plurality of the terminal devices P1, P2 . . . Pn, so as to according to different data generation speeds of the plurality of the terminal devices P1, P2 . . . Pn, corresponding data is stored in segment in the replay buffer in a first-in-first-out order, which is beneficial to data maintenance. For example: the plurality of the game data obtained from the terminal device P1 is stored in the segment replay buffer b1 corresponding to the terminal device P1, and the plurality of the game data obtained from the terminal device P2 is stored in the segment replay buffer b2 corresponding to the terminal device P2.

Due to a large amount of game data generated by the plurality of the terminal devices and an uneven speed of the game data, by storing the plurality of the game data of the plurality of the terminal devices P1, P2 . . . Pn in segments, the sampling efficiency is improved.

Step S102, taking a sample of the plurality of the game data according to a preset priority, and obtaining a sampling result.

Specifically, since the plurality of the game data generated by the plurality of the terminal devices P1, P2 . . . Pn are preset with corresponding priorities, the priority information of each game data is stored in a sum tree structure. Then, the game data is taken a sample of according to the priority information obtained.

It should be noted that the sum tree structure includes parent nodes and leaf nodes, and according to a generating sequence of the plurality of the game data in the plurality of the terminal devices P1, P2 . . . Pn, the priorities corresponding to the data is sequentially stored in the leaf nodes of the sum tree structure, and from left to right, every two leaf nodes form one parent node, so as to obtain the priority stored in each leaf node according to the parent node index. Since the structure of the sum tree is a prior art, it will not be described here.

Step S104, inputting the sampling result into a preset loss function to train a model according to a calculation result of the loss function.

Specifically, a formula of the loss function is:

$$l_t(\theta) = \frac{1}{2}(G_t - q(S_t, A_t, \theta))^2;$$

$$G_t = \lambda^n q\left(S_{t+n}, \underset{a}{\operatorname{argmax}} q(S_{t+n}, a, \theta), \theta^-\right);$$

wherein, $l_t(\theta)$ represents the loss function, $S_t$ represents a state at time t, $A_t$ represents an action at time t, $G_t$ represents target data when a game is not over, t represents a sampling time index beginning at the state $S_t$ and the action $A_t$, and $\theta$ represents a parameter used for an action selection, $\theta$ changes with training, n represents a number of actions performed, $\lambda$ is a constant, and $0 < \lambda < 1$, $S_{t+n}$ represents the state after n actions are performed after the time t, and $\alpha$ represents the action performed, $\theta^-$ represents the parameter copied from $\theta$ by cycle.

It's required to be explained that the q function is a state-to-action value function and also a cumulative reward value, when an initial state is specified, a corresponding environmental reward is obtained by performing a specified action.

The method of training a model provided in the embodiment of the present invention greatly improves the training speed and accuracy of the model by storing the received game data in segments and taking a sample of the game data according to the preset priority, thereby improves the robot performance.

In an exemplary embodiment, the method of training a model further includes synchronizing the model to the plurality of the terminal devices according to a training result of the model to make the plurality of the terminal devices input the obtained game data into the model to obtain a Q value of each action performed by a virtual object in the terminal devices.

Exemplarily, with reference to FIG. 1, the server S synchronizes the trained model to the plurality of the terminal devices P1. P2 . . . Pn every preset time (for example, 10 seconds), and then the plurality of the terminal devices P1, P2 . . . Pn uses the model to generate a corresponding Q value. By synchronizing the model to the plurality of the terminal devices, the plurality of the terminal devices can generate a more accurate Q value according to the newly trained model.

Figure 3:
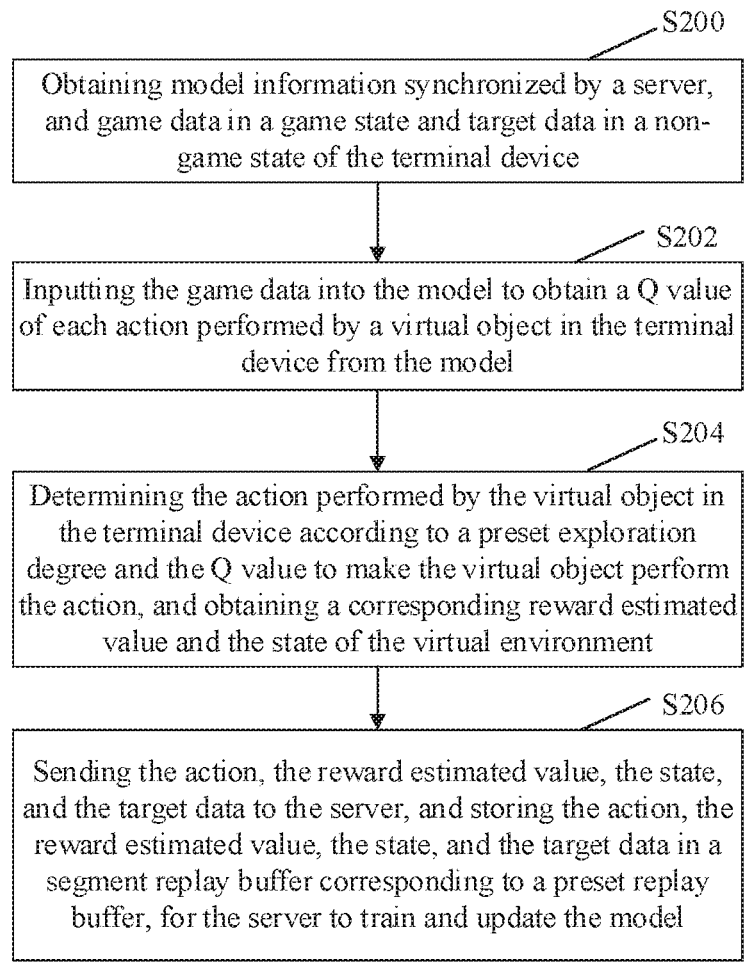
FIG. 3 illustrates an optional flowchart of a method of training a model according to the embodiment of the present disclosure.

It should be noted that the Q value reflects the rewards of the virtual environment in a certain state and after the corresponding action is executed. FIG. 3 illustrates another optional flowchart of a method of training a model according to an embodiment of the present invention, which is applied to a terminal device, as shown in FIG. 3, the method specifically includes the following steps:

Step S200, obtaining model information synchronized by a server, and game data in a game state and target data in a non-game state of the terminal device, wherein the game data includes at least the state of a virtual environment when the terminal device is in the game state, the target data includes at least an over state of the virtual environment when the terminal device is in the non-game state, an action in the non-game state, and a target reward value obtained after performing the action in the non-game state.

Exemplarily, with reference to FIG. 1, the terminal device P1 is provided with a python process for receiving model information synchronized by the server S, the game data in the game state and the target data in the non-game state of the terminal device P1. For example: from the beginning of the game, the state data of the virtual environment after each action performed by the virtual object of the terminal device P: when the game is over, the over state data of the virtual environment in the terminal device P1, the action performed by the virtual object at the end and virtual environment target reward value obtained after performing the action.

Step S202, inputting the game data into the model to obtain a Q value of each action performed by a virtual object in the terminal device from the model.

Specifically, the model is composed of a loss function, and the specific formula of the loss function is:

$$l_t(\theta) = \frac{1}{2}(G_t - q(S_t, A_t, \theta))^2;$$

$$G_t = \lambda^n q\left(S_{t+n}, \underset{a}{\operatorname{argmax}} q(S_{t+n}, a, \theta), \theta^-\right);$$

wherein, $l_t(\theta)$ represents the loss function, $S_t$ represents a state at time t, $A_t$ represents an action at time t, $G_t$ represents target data when a game is not over, t represents a sampling time index beginning at the state $S_t$ and the action $A_t$, and $\theta$ represents a parameter used for an action selection, $\theta$ changes with training, n represents a number of actions performed, λ is a constant, and 0<λ<1, $S_{t+n}$ represents the state after n actions are performed after the time t, and α represents the action performed, $θ^-$ represents the parameter copied from θ by cycle.

With reference to FIG. 1, the terminal device P1 inputs the received state data of the virtual environment into the above model, executes the q function in the model, and obtains the Q value of each action performed by the virtual object. For example, state 1 is input into the model, and the obtained output results of the model are: action 1, Q value is Q1; action 2, Q value is Q2; action 3, Q value is Q3: action 4, Q value is Q4.

Step S204, determining the action performed by the virtual object in the terminal device according to a preset exploration degree and the Q value to make the virtual object perform the action, and obtaining a corresponding reward estimated value and the state of the virtual environment, wherein the exploration degree represents a credibility of performing the action corresponding to a maximum value of the Q value.

Exemplarily, in conjunction with FIG. 1, if the output result of the model is Q3>Q2>Q4>Q1, that is, Q3 is the maximum value, it is determined whether the virtual object in the terminal device P1 executes the action 3 or randomly executes any one of the action 1, the action 2, the action 3, and the action 4 according to Q3 and the preset exploration degree. After the virtual object performs the determined action, the state of the virtual environment is obtained, and the reward estimated value after the virtual object performs the determined action is obtained after the virtual object performs a preset number of actions. In the embodiment of the present invention, the preset number of actions is described by taking n as an example.

Specifically, both the terminal device and the other terminal devices are numbered, for example, in FIG. 1, the number of the terminal device P1 is 1, and the number of the terminal device P2 is 2. Of course, the terminal devices P1, P2 . . . Pn can be set according to the conditions of the corresponding terminal devices to determine the exploration degree of each terminal device. Wherein a calculation formula for the exploration degree is specifically as follows:

$$\epsilon_i = \epsilon^{1+\frac{i}{N-1}\alpha};$$

wherein, the ϵ, α, and N are constants, and i represents a number of the terminal device, and the larger the number of the terminal device is, the higher the exploration degree is. In an exemplary embodiment, ϵ=0.7, α=11, N=1000.

It should be noted that the higher the exploration degree, the lower the probability of executing the action 3; the lower the exploration degree, the higher the probability of executing the action 3.

Step S206, sending the action, the reward estimated value, the state, and the target data to the server, and storing the action, the reward estimated value, the state, and the target data in a segment replay buffer corresponding to a preset replay buffer, for the server to train and update the model.

Exemplarily, with reference to FIG. 1, when the action performed by the virtual object in the terminal device P1 determined according to the Q3 and the preset exploration degree is the action 3, then the action 3, the state of the environment after performing the action 3, the reward estimated value obtained after the virtual object performs n actions, and the target data are sent to the server S. Then, after being received by the server S, the action 3, the state of the virtual environment after performing the action 3, reward estimated value obtained after the virtual object performs n actions, and the target data are stored in the segment replay buffer corresponding to the terminal device P1. Then, the server S trains and updates the model according to the data, wherein the data includes the action 3, the state of the virtual environment after performing the action 3, the reward estimated value obtained after the virtual object performs n actions, and the target data.

The method of training a model provided by the present invention, by inputting state data of a virtual environment in a game state into a model, and obtaining an action performed by a virtual object, a state of the virtual environment after performing the action and a reward estimated value obtained from the environment, and sending the data to a server to train and update the model, so as to achieve an effect of fully training the model in the case of sparse rewards, greatly improving a robot performance.

Figure 4:
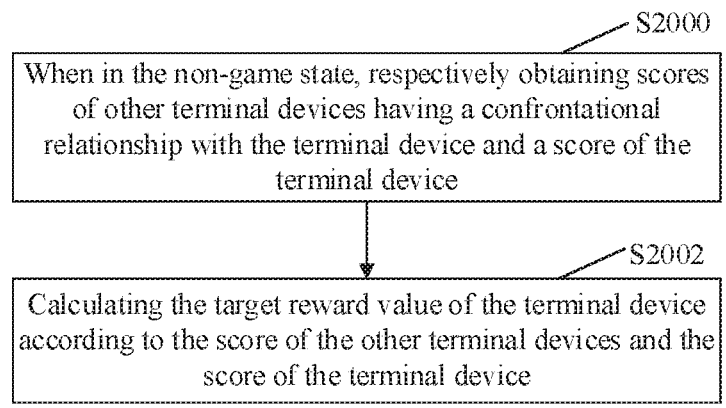
FIG. 4 illustrates an optional schematic diagram of a specific flowchart of step S200 in FIG. 8.

In an exemplary embodiment, as shown in FIG. 4, the step S200 further includes steps S2000 to S2002.

Step S2000, when in the non-game state, respectively obtaining scores of other terminal devices having a confrontational relationship with the terminal device and a score of the terminal device, wherein the score includes at least a construction score, an arms score, and an economic score.

Exemplarily, in conjunction with FIG. 1, if the terminal device P1 and the terminal device P2 are in a confrontational relationship, when the game is over, the terminal device P1 obtains a total score of the construction score, the arms score and the economic score of the terminal device P1 and the terminal device P2 respectively.

Step S2002, calculating the target reward value of the terminal device according to the score of the other terminal devices and the score of the terminal device.

Specifically, the formula for calculating the target reward value of the terminal device is:

$$r_{new} = \gamma^{timedecay} \frac{S_{our} - S_{enemy}}{\max(S_{our}, S_{enemy})};$$

wherein, the $r_{new}$ represents the reward value of the terminal device, the timedecay represents a game duration, γ is a constant, and 0<γ<1, the $\gamma^{timedecay}$ represents the longer the time, the smaller the value of the constant, and the $S_{our}$ represents the score of the terminal device, and the $S_{enemy}$ represents the score of the other terminal device.

Figure 5:
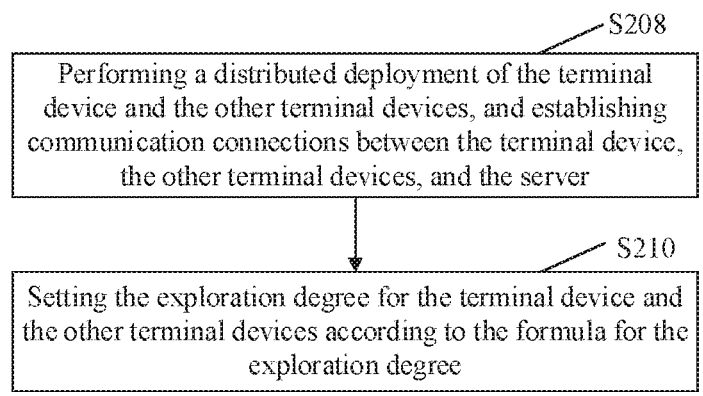
FIG. 5 illustrates an optional flowchart of the method of training a model according to the embodiment of the present disclosure.

In an exemplary embodiment, as shown in FIG. 5, the method further includes steps S208 to S210.

Step S208, performing a distributed deployment of the terminal device and the other terminal devices, and establishing communication connections between the terminal device, the other terminal devices, and the server.

Exemplarily, with reference to FIG. 1, the terminal devices P1 and P2 are performed the distributed deployment, and the communication connections between the terminal device P1, P2 and the server S are established. Due to a large number of participants in the game, in a real distributed deployment, a plurality of terminal devices are existed, such as the terminal devices P1, P2 . . . Pn in FIG. 1, and the communication connections between the terminal devices P1, P2 . . . Pn and the server S are established.

Step S210, setting the exploration degree for the terminal device and the other terminal devices according to the formula for the exploration degree.

Exemplarily, after the terminal device and the other terminal devices are deployed, and the communication connections with the server are respectively established, the exploration degree is set according to the formula for the exploration degree and the corresponding number of the terminal device and the other terminal devices.

Figure 6:
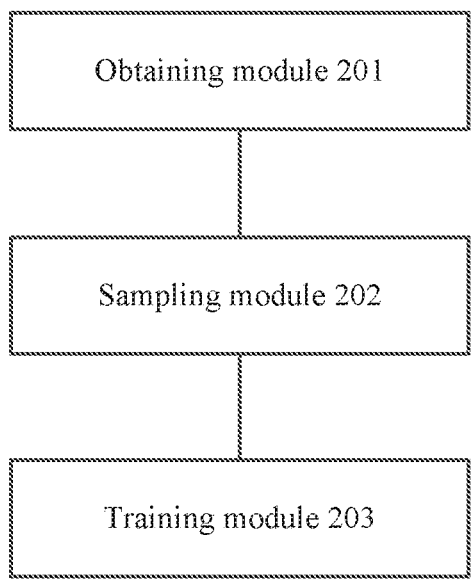
FIG. 6 illustrates an optional schematic diagram of program module of a server according to an embodiment of the present disclosure.

Based on the method of training a model provided in the above embodiment, a server is provided in the embodiment, specifically, FIG. 6 illustrates an optional structure diagram of program module of the server, the server is divided into one or more program modules, one or more program modules are stored in a storage medium, and are executed by one or more processors to complete the present invention. The program modules referred in the present invention refers to a series of computer program instruction segments that can complete specific functions, which is more suitable for describing the execution process of the server in the storage medium than the program itself, the following description will specifically introduce the function of each program module of the embodiment.

As shown in FIG. 6, the server S specifically includes the following components:

An obtaining module 201, is for obtaining a plurality of game data from a plurality of terminal devices respectively, wherein, the plurality of the game data is stored in a replay buffer, the replay buffer includes a plurality of segment replay buffers, and the game data obtained from different terminal devices are stored in the segment replay buffers corresponding to the replay buffer.

Exemplarily, with reference to FIG. 1, after the obtaining module 201 respectively obtains the plurality of the game data from the plurality of the terminal devices P1, P2 . . . Pn, the obtaining module 201 stores the plurality of the data in the segment replay buffers of the replay buffer according to the plurality of the terminal devices P1, P2 . . . Pn, so as to according to the different data generation speeds of the plurality of the terminal devices P1, P2 . . . Pn, corresponding data is stored in segment in the replay buffer in a first-in-first-out order, which is beneficial to data maintenance. For example: the plurality of the game data obtained from the terminal device P1 are stored in the segment replay buffer b1 corresponding to the terminal device P1, and the plurality of the game data obtained from the terminal device P2 is stored in the segment replay buffer b2 corresponding to the terminal device P2.

Due to a large amount of game data generated by the plurality of the terminal devices and an uneven speed of the game data, by storing the plurality of the game data of the plurality of the terminal devices P1, P2 . . . Pn in segments, the sampling efficiency is improved.

A sampling module 202, taking a sample of the plurality of the game data according to a preset priority, and obtaining a sampling result.

Specifically, since the plurality of the game data generated by the plurality of the terminal devices P1, P2 . . . Pn are preset with corresponding priorities, the priority information of each game data is stored in a sum tree structure. Then, sampling module 202 takes a sample of the game data according to the priority information obtained.

It should be noted that the sum tree structure includes parent nodes and leaf nodes, and according to a generating sequence of the plurality of the game data in the plurality of the terminal devices P1, P2 . . . Pn, the priorities corresponding to the data is sequentially stored in the leaf nodes of the sum tree structure, and from left to right, every two leaf nodes form one parent node, so as to obtain the priority stored in each leaf node according to the parent node index. Since the structure of the sum tree is a prior art, it will not be described here.

A training module 203, inputting the sampling result into a preset loss function to train a model according to a calculation result of the loss function.

Specifically, a formula of the loss function is:

$$l_t(\theta) = \frac{1}{2}(G_t - q(S_t, A_t, \theta))^2;$$

$$G_t = \lambda^n q\left(S_{t+n}, \underset{a}{\operatorname{argmax}} q(S_{t+n}, a, \theta), \theta^-\right);$$

wherein, $l_t(\theta)$ represents the loss function, $S_t$ represents a state at time t, $A_t$ represents an action at time t, $G_t$ represents target data when a game is not over, t represents a sampling time index beginning at the state $S_t$ and the action $A_t$, and $\theta$ represents a parameter used for an action selection, $\theta$ changes with training, n represents a number of actions performed, $\lambda$ is a constant, and $0<\lambda<1$, $S_{t+n}$ represents the state after n actions are performed after the time t, and $\alpha$ represents the action performed, $\theta^-$ represents the parameter copied from $\theta$ by cycle.

It's required to be explained that the q function is a state-to-action value function and also a cumulative reward value, when an initial state is specified, a corresponding environmental reward is obtained by performing a specified action.

In an exemplary embodiment, the server S further includes a synchronizing module.

The synchronizing module, synchronizing the model to the plurality of the terminal devices according to a training result of the model to make the plurality of the terminal devices input the obtained game data into the model to obtain a Q value of each action performed by a virtual object in the terminal devices.

Exemplarily, with reference to FIG. 1, the server S synchronizes the trained model to the plurality of the terminal devices P1, P2 . . . Pn every preset time (for example, 10 seconds), and then the plurality of the terminal devices P1, P2 . . . Pn uses the model to generate a corresponding Q value. By synchronizing the model to the plurality of the terminal devices, the plurality of the terminal devices can generate a more accurate Q value according to the newly trained model.

It should be noted that the Q value reflects the rewards of the virtual environment in a certain state and after the corresponding action is executed.

Figure 7:
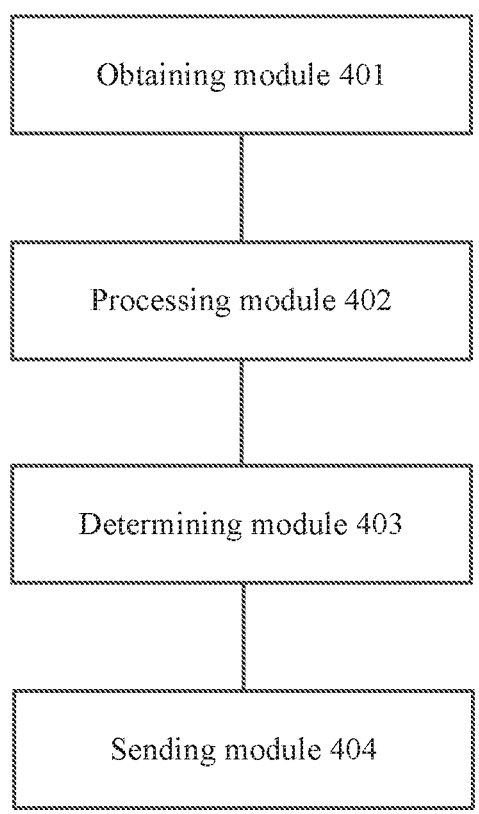
FIG. 7 illustrates an optional schematic diagram of program module of a terminal device according to an embodiment of the present disclosure.

The server provided in the embodiment of the present invention greatly improves the training speed and accuracy of the model by storing the received game data in segments and taking a sample of the game data according to the preset priority, thereby improves the robot performance. Based on the method of training a model provided in the above embodiment, a terminal device is further provided in the embodiment, specifically, FIG. 7 illustrates an optional structure diagram of program module of the terminal device, the terminal device is divided into one or more program modules, one or more program modules are stored in a storage medium, and are executed by one or more processors to complete the present invention. The program modules referred in the present invention refer to a series of computer program instruction segments that can complete specific functions, which is more suitable for describing the execution process of the terminal device in the storage medium than the program itself, the following description will specifically introduce the function of each program module of the embodiment.

As shown in FIG. 7, the terminal device specifically includes the following components:

an obtaining module 401, obtaining model information synchronized by a server, and game data in a game state and target data in a non-game state of the terminal device, wherein the game data includes at least the state of a virtual environment when the terminal device is in the game state, the target data includes at least an over state of the virtual environment when the terminal device is in the non-game state, an action in the non-game state, and a target reward value obtained after performing the action in the non-game state.

Exemplarily, with reference to FIG. 1, the terminal device P1 is provided with a python process for receiving model information synchronized by the server S, the game data in the game state and the target data in the non-game state of the terminal device P1. For example: from the beginning of the game, the state data of the virtual environment after each action performed by the virtual object of the terminal device P1; when the game is over, the over state data of the virtual environment in the terminal device P1, the action performed by the virtual object at the end and virtual environment target reward value obtained after performing the action.

A processing module 402, inputting the game data into the model to obtain a Q value of each action performed by a virtual object in the terminal device from the model.

Specifically, the model is composed of a loss function, and the specific formula of the loss function is:

$$l_t(\theta) = \frac{1}{2}(G_t - q(S_t, A_t, \theta))^2;$$

$$G_t = \lambda^n q\left(S_{t+n}, \underset{a}{\mathrm{argmax}}\, q(S_{t+n}, a, \theta), \theta^-\right);$$

wherein, $l_t(\theta)$ represents the loss function, $S_t$ represents a state at time t, $A_t$ represents an action at time t, $G_t$ represents target data when a game is not over, t represents a sampling time index beginning at the state $S_t$ and the action $A_t$, and $\theta$ represents a parameter used for an action selection, $\theta$ changes with training, n represents a number of actions performed, $\lambda$ is a constant, and $0<\lambda<1$, $S_{t+n}$ represents the state after n actions are performed after the time t, and $\alpha$ represents the action performed, $\theta^-$ represents the parameter copied from $\theta$ by cycle.

With reference to FIG. 1, the processing module 402 inputs the received state data of the virtual environment into the above model, executes the q function in the model, and obtains the Q value of each action performed by the virtual object. For example, state 1 is input into the model, and the obtained output results of the model are: action 1, Q value is Q1; action 2, Q value is Q2; action 3, Q value is Q3; action 4, Q value is Q4.

A determining module 403, is for determining the action performed by the virtual object in the terminal device according to a preset exploration degree and the Q value to make the virtual object perform the action, and obtaining a corresponding reward estimated value and the state of the virtual environment, wherein the exploration degree represents a credibility of performing the action corresponding to a maximum value of the Q value.

Exemplarily, in conjunction with FIG. 1, if the output result of the model is Q3>Q2>Q4>Q1, that is, Q3 is the maximum value, the determining module 403 determines whether the virtual object in the terminal device P1 executes the action 3 or randomly executes any one of the action 1, the action 2, the action 3, and the action 4 according to Q3 and the preset exploration degree. After the virtual object performs the determined action, the state of the virtual environment is obtained, and the reward estimated value after the virtual object performs the determined action is obtained obtain after the virtual object performs a preset number of actions. In the embodiment of the present invention, the preset number of actions is described by taking n as an example.

Specifically, both the terminal device and the other terminal devices are numbered, for example, in FIG. 1, the number of the terminal device P1 is 1, and the number of the terminal device P2 is 2. Of course, the terminal devices P1, P2 . . . Pn can be set according to the conditions of the corresponding terminal devices to determine the exploration degree of each terminal device. Wherein a calculation formula for the exploration degree is specifically as follows:

$$\epsilon_i = \epsilon^{1+\frac{i}{N-1}\alpha};$$

wherein, the $\epsilon$, $\alpha$, and N are constants, and i represents a number of the terminal device, and the larger the number of the terminal device is, the higher the exploration degree is. In an exemplary embodiment, $\epsilon=0.7$, $\alpha=11$, $N=1000$.

It should be noted that the higher the exploration degree, the lower the probability of executing the action 3; the lower the exploration degree, the higher the probability of executing the action 3.

A sending module 404, sending the action, the reward estimated value, the state, and the target data to the server, and storing the action, the reward estimated value, the state, and the target data in a segment replay buffer corresponding to a preset replay buffer, for the server to train and update the model.

Exemplarily, with reference to FIG. 1, when the action performed by the virtual object in the terminal device P1 determined according to the Q3 and the preset exploration degree is the action 3, then the sending module 404 sends the action 3, the state of the environment after performing the action 3, the reward estimated value obtained after the virtual object performs n actions, and the target data to the server S. Then, after being received by the server S, the action 3, the state of the virtual environment after performing the action 3, reward estimated value obtained after the virtual object performs n actions, and the target data are stored in the segment replay buffer corresponding to the terminal device P1. Then, the server S trains and updates the model according to the data, wherein the data includes the action 3, the state of the virtual environment after performing the action 3, the reward estimated value obtained after the virtual object performs n actions, and the target data.

In an exemplary embodiment, the obtaining module 401, when in the non-game state, respectively obtaining scores of other terminal devices having a confrontational relationship with the terminal device and a score of the terminal device, wherein the score includes at least a construction score, an arms score, and an economic score.

Exemplarily, in conjunction with FIG. 1, if the terminal device P1 and the terminal device P2 are in a confrontational relationship, when the game is over, the obtaining module 401 obtains a total score of the construction score, the arms score and the economic score of the terminal device P1 and the terminal device P2 respectively.

The obtaining module 401, calculating the target reward value of the terminal device according to the score of the other terminal devices and the score of the terminal device.

Specifically, the formula for calculating the target reward value of the terminal device is:

$$r_{new} = \gamma^{timedecay} \frac{S_{our} - S_{enemy}}{\max(S_{our}, S_{enemy})};$$

wherein, the $r_{new}$ represents the reward value of the terminal device, the timedecay represents a game duration, $\gamma$ is a constant, and $0<\gamma<1$, the $\gamma^{timedecay}$ represents the longer the time, the smaller the value of the constant, and the $S_{our}$ represents the score of the terminal device, and the $S_{enemy}$ represents the score of the other terminal device.

In an exemplary embodiment, the terminal device P1 further includes a deployment module and a setting module, wherein the deployment module, performing a distributed deployment of the terminal device and the other terminal devices, and establishing communication connections between the terminal device, the other terminal devices, and the server.

Exemplarily, with reference to FIG. 1, the terminal devices P1 and P2 are performed the distributed deployment, and the communication connections between the terminal device P1, P2 and the server S are established. Due to a large number of participants in the game, in a real distributed deployment, a plurality of terminal devices are existed, such as the terminal devices P1, P2 . . . Pn in FIG. 1, and the communication connections between the terminal devices P1, P2 . . . Pn and the server S are established.

The setting module, setting the exploration degree for the terminal device and the other terminal devices according to the formula for the exploration degree.

Exemplarily, after the terminal device and the other terminal devices are deployed, and the communication connections with the server are respectively established, the exploration degree is set according to the formula for the exploration degree and the corresponding number of the terminal device and the other terminal devices.

The terminal device provided by the present invention, by inputting state data of a virtual environment in a game state into a model, and obtaining an action performed by a virtual object, a state of the virtual environment after performing the action and a reward estimated value obtained from the environment, and sending the data to a server to train and update the model, so as to achieve an effect of fully training the model in the case of sparse rewards, greatly improving a robot performance.

Figure 8:
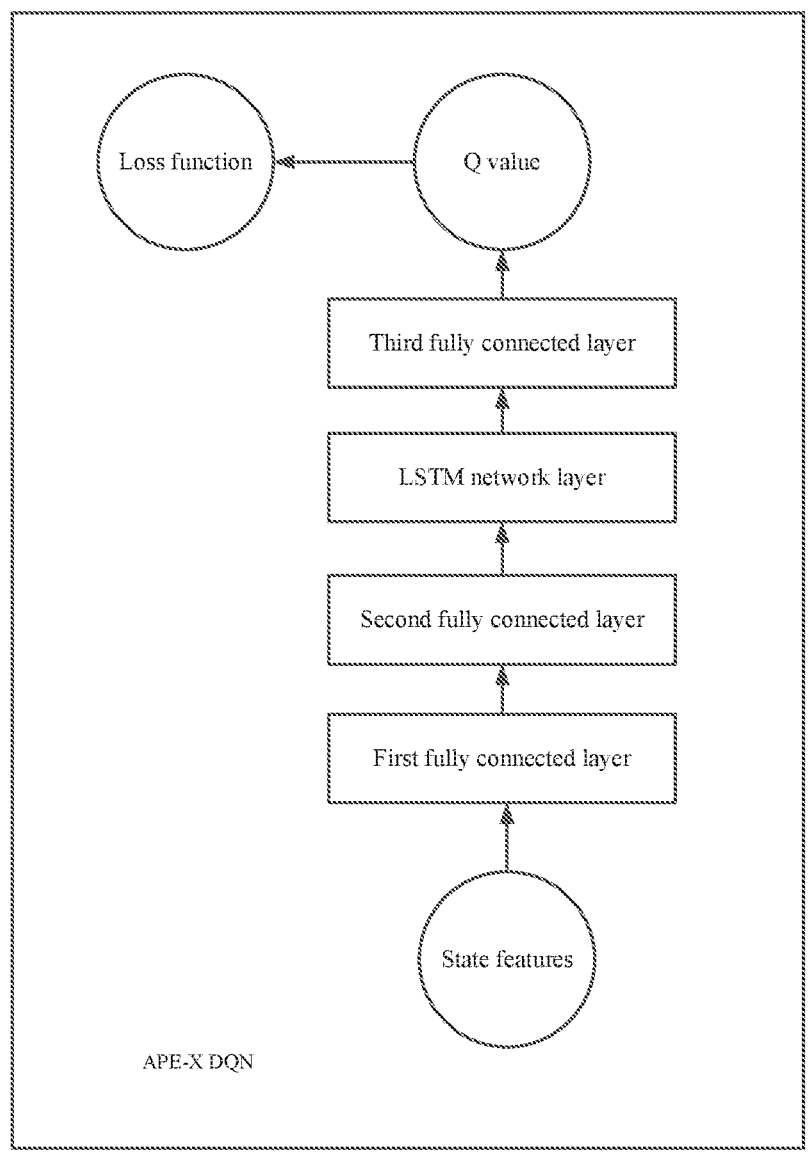
FIG. 8 illustrates an optional model architecture diagram of generating data according to the embodiment of the present disclosure.

FIG. 8 is a model architecture diagram of the method of generating data according to an embodiment of the present invention. The model is an improved APE-X (a distributed architecture for deep reinforcement learning) Deep Q-Network (DQN) model (APE-X DQN). The model includes an input layer, a first fully connected layer, a second fully connected layer, a Long Short-Term Memory (LSTM) network layer, a third fully connected layer, and a loss function calculation layer. After the plurality of the state features of the terminal device P1 are extracted from the game data, since the plurality of the state features are extracted according to the preset time, the plurality of the state features are sequentially passed through the first fully connected layer and the second fully connected layer, and the target feature corresponding to the preset time is obtained from the second fully connected layer.

It should be noted that the fully connected layers are used to perform a weighted summation of input features, and the loss function calculation layer is used to train the model according to the Q value and the game data. Exemplarily, in conjunction with FIG. 8, the target state feature obtained from the second fully connected layer and the time corresponding to the target state feature constitute the feature sequence.

In an exemplary embodiment, referring to FIG. 8, in the loss function calculation layer, the Q value generated by the model and an actual reward value after the terminal device performs a corresponding action in one state are input into a loss function to perform a calculation, and the model is trained according to a calculation result. It should be noted that the Q value reflects the reward of the virtual environment after the corresponding action is executed at a certain state.

Specifically, with reference to FIG. 1, after the model generates the Q value of the terminal device P1 in each state, the action performed by the virtual object in the terminal device P1 is determined according to a preset exploration degree and the Q value, and after the virtual object performs the action, a corresponding reward estimated value is obtained, and a loss value of the model is calculated based on the reward estimated value and an actual reward value after the terminal device performs the corresponding action in the state, so as to adjust parameter information of the model according to the loss value.

Figure 9:
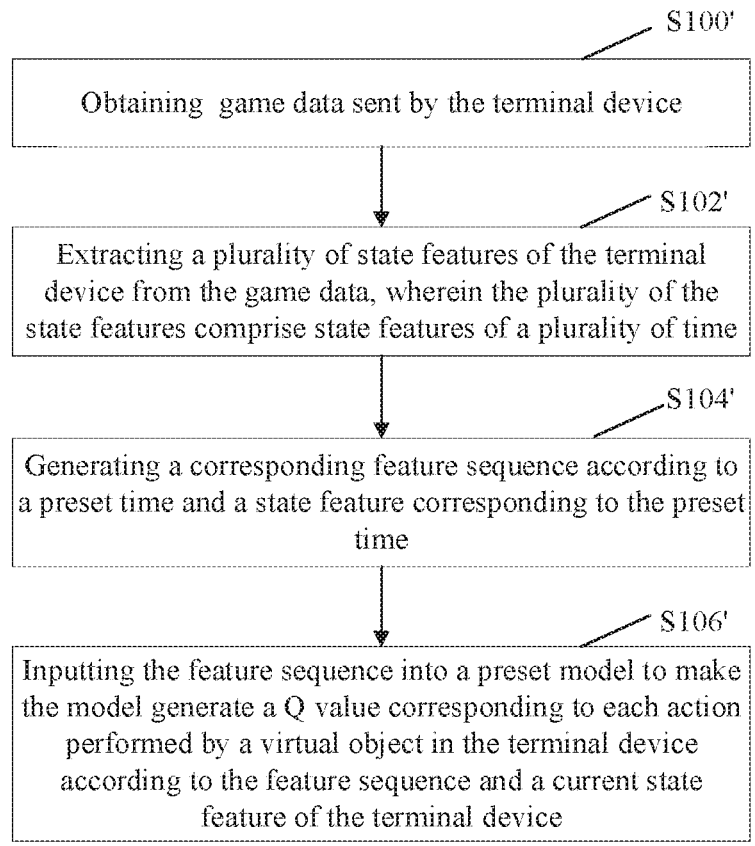
FIG. 9 illustrates an optional flowchart of a method of generating data according to the embodiment of the present disclosure.

It should be noted that the exploration degree represents the credibility of performing the action corresponding to the largest value of the Q value. The higher the exploration degree is, the lower the probability of the terminal device P performing the action corresponding to the largest data of the Q value, and the lower the credibility of performing the action corresponding to the largest value of the Q value. FIG. 9 is a flowchart of a method of generating data according to an embodiment of the present invention, it can be understood that the flowchart in the embodiment of the method is not used to limit the order of execution of the steps. The following is an illustrative description with the server S as an execution body.

As shown in FIG. 9, the method of generating data specifically includes steps S100' to S106'.

Step S100', obtaining game data sent by the terminal device.

Exemplarily, with reference to FIG. 1, the server S obtains the game data sent by a plurality of terminal devices P1, P2 . . . Pn, and the game data includes state data of the terminal devices P1, P2 . . . Pn in a game state and a non-game state, actions performed and the reward values obtained by performing the actions.

Step S102', extracting a plurality of state features of the terminal device from the game data, wherein the plurality of the state features comprise state features of a plurality of time.

Figure 10:
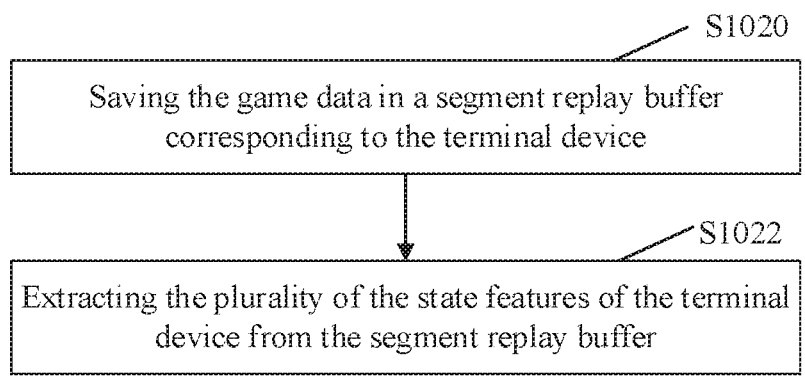
FIG. 10 illustrates an optional schematic diagram of a specific flowchart of step S102' in FIG. 9 according to the embodiment of the present disclosure.

In an exemplary embodiment, as shown in FIG. 10, the step S102' includes steps S1020 to S1022.

Step S1020, saving the game data in a segment replay buffer corresponding to the terminal device.

Exemplarily, the game data is stored in a corresponding segment replay buffer of the replay buffer according to a difference of the terminal devices, and the replay buffer includes a plurality of segment replay buffers. With reference to FIG. 1, when a plurality of game data are respectively obtained from a plurality of terminal devices P1, P2 . . . Pn, the plurality of the data are stored in the segment replay buffers of the replay buffer according to the plurality of the terminal devices P1, P2 . . . Pn, so as to according to different data generation speeds of the plurality of the terminal devices P1, P2 . . . Pn, the corresponding data is stored in segment in the replay buffer in a first-in-first-out order, which is beneficial to data maintenance. For example: the plurality of game data obtained from the terminal device P1 is stored in the segment replay buffer b1 corresponding to the terminal device P1.

Step S1022, extracting the plurality of the state features of the terminal device from the segment replay buffer.

Exemplarily, in conjunction with FIG. 1, a plurality of state features of the terminal device P1 are extracted from the segment replay buffer b1 according to a preset rule. It should be noted that the plurality of the state features are state features of the terminal device P1 after the virtual object in the terminal device P1 performs each action within a preset period of time. Each state feature corresponds to a time.

Step S104', generating a corresponding feature sequence according to a preset time and a state feature corresponding to the preset time.

Since the state feature corresponds to the preset time one-to-one, the preset time and the state feature corresponding to the preset time form one feature sequence.

Step S106', inputting the feature sequence into a preset model to make the model generate a Q value corresponding to each action performed by a virtual object in the terminal device according to the feature sequence and a current state feature of the terminal device, wherein the model includes at least a first fully connected layer, a second fully connected layer, a LSTM network, and a third fully connected layer.

Figure 11:
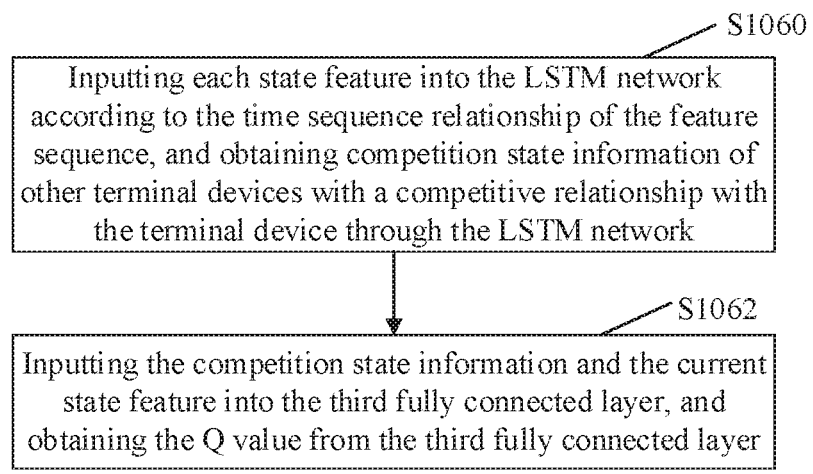
FIG. 11 illustrates an optional schematic diagram of a specific flowchart of step S106' in FIG. 9 according to the embodiment of the present disclosure.

In an exemplary embodiment, as shown in FIG. 11, since each target state feature in the feature sequence has a certain time sequence relationship, the step S106' specifically includes steps S1060 to S1062, wherein:

Step S1060, inputting each state feature into the LSTM network according to the time sequence relationship of the feature sequence, and obtaining competition state information of other terminal devices with a competitive relationship with the terminal device through the LSTM network.

It should be noted that a time step of the LSTM network is set to 30 seconds in the game to capture most of macroscopic change information during the game.

Exemplarily, the working principle of the LSTM network can be as follows:

$$f_t = \sigma(W_{xf}*F_t + W_{hf}*\hat{H}_{t-1} + b_f)$$

$$g_t = \tan h(W_{xg}*F_t + W_{hg}*\hat{H}_{t-1} + b_g)$$

$$i_t = \sigma(W_{xi}*F_t + W_{hi}*\hat{H}_{t-1} + b_i)$$

$$C_t = f_t \odot \hat{C}_{t-1} + i_t \odot g_t$$

$$o_t = \sigma(W_{xo}*F_t + W_{ho}*\hat{H}_{t-1} + b_o)$$

$$H_t = o_t \odot \tan h(C_t)$$

A forgetting gate, is used to receive memory information and determine which part of the memory information to keep and forget;

wherein, the $f_t$ is a forgetting factor, $f_t \in [0,1]$, and the $f_t$ represents a selection weight of a target unit state information $\hat{C}_{t-1}$ at time t, wherein the target unit state information $\hat{C}_{t-1}$ is output at time t-1, the $f_t$ is used to determine whether to make the memory information (that is, the target unit state information $\hat{C}_{t-1}$ output and converted at time t-1) learned at time t-1 passed or partially passed.

An input gate, is used to select information to be memorized;

the $i_t \in [0,1]$, and the $i_t$ represents a selection weight of a temporary unit state information $g_t$ at time t, and $g_t$ is the temporary unit state information at time t;

the $f_t \odot \hat{C}_{t-1}$ indicates information that is wished to delete, and the $i_t \odot g_t$ indicates newly added information, and the unit state information $C_t$ at time t can be obtained through the two parts of the $f_t \odot \hat{C}_{t-1}$ and the $i_t \odot g_t$.

An output gate is used to output hidden state information at time t, wherein, the $o_t \in [0,1]$, and $o_t$ is the selection weight of the unit state information at time t.

It should be noted that, $W_{xf}$, $W_{hf}$, $W_{xg}$, $W_{hg}$, $W_{xi}$, $W_{hi}$, $W_{xo}$ and $W_{ho}$ are all weight parameters in the LSTM network; $b_f$, $b_g$, $b_i$ and $b_o$ are all bias items in the LSTM network; and the parameters are obtained through a model training.

It should be noted that the above exemplary structure of the LSTM network is not used to limit the scope of patent protection of the present invention.

Step S1062, inputting the competition state information and the current state feature into the third fully connected layer, and obtaining the Q value from the third fully connected layer.

Through the embodiments of the present invention, it is possible to effectively infer future state and rewards according to current partial observations during the game, so as to make a correct macro action selection.

Figure 12:
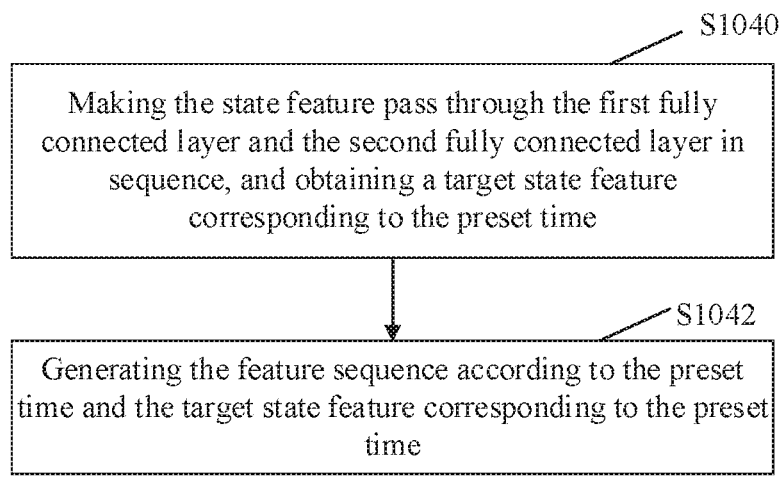
FIG. 12 illustrates an optional schematic diagram of a specific flowchart of step S104' in FIG. 9 according to the embodiment of the present disclosure.

In an exemplary embodiment, as shown in FIG. 12, the step S104' further includes steps S1040 to S1042, wherein:

Step S1040, making the state feature pass through the first fully connected layer and the second fully connected layer in sequence, and obtaining a target state feature corresponding to the preset time.

With reference to FIG. 1 and FIG. 8, FIG. 8 is a model architecture diagram of the method of generating data according to an embodiment of the present invention. The model is an improved APE-X DQN model. The model includes an input layer, the first fully connected layer, the second fully connected layer, the LSTM network layer, the third fully connected layer, and a loss function calculation layer. After the plurality of the state features of the terminal device P1 are extracted from the game data, since the plurality of the state features are extracted according to the preset time, the plurality of the state features are sequentially passed through the first fully connected layer and the second fully connected layer, and the target feature corresponding to the preset time is obtained from the second fully connected layer.

It should be noted that the fully connected layers are used to perform a weighted summation of input features, and the loss function calculation layer is used to train the model according to the Q value and the game data.

Step S1042, generating the feature sequence according to the preset time and the target state feature corresponding to the preset time.

Exemplarily, in conjunction with FIG. 8, the target state feature obtained from the second fully connected layer and the time corresponding to the target state feature constitute the feature sequence.

In an exemplary embodiment, referring to FIG. 8, in the loss function calculation layer, the Q value generated by the model and an actual reward value after the terminal device performs a corresponding action in one state are input into a loss function to perform a calculation, and the model is trained according to a calculation result. It should be noted that the Q value reflects the reward of the virtual environment after the corresponding action is executed at a certain state.

Specifically, with reference to FIG. 1, after the model generates the Q value of the terminal device P1 in each state, the action performed by the virtual object in the terminal device P1 is determined according to a preset exploration degree and the Q value, and after the virtual object performs the action, a corresponding reward estimated value is obtained, and a loss value of the model is calculated based on the reward estimated value and an actual reward value after the terminal device performs the corresponding action in the state, so as to adjust parameter information of the model according to the loss value.

It should be noted that the exploration degree represents the credibility of performing the action corresponding to the largest value of the Q value. The higher the exploration degree is, the lower the probability of the terminal device P performing the action corresponding to the largest data of the Q value, and the lower the credibility of performing the action corresponding to the largest value of the Q value.

Figure 13:
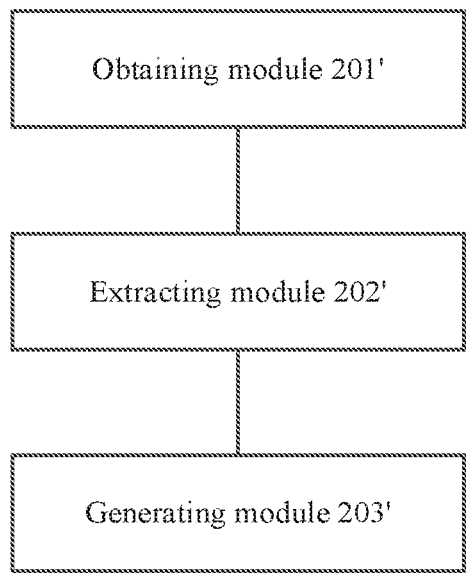
FIG. 13 illustrates an optional schematic diagram of program module of a system of generating data according to an embodiment of the present disclosure.

FIG. 13 illustrates an optional structure diagram of program module of the system of generating data, the system of generating data is divided into one or more program modules, the one or more program modules are stored in a storage medium, and are executed by one or more processors to complete the present invention. The program modules referred in the present invention refer to a series of computer program instruction segments that can complete specific functions, which is more suitable for describing the execution process of the system of generating data in the storage medium than the program itself, the following description will specifically introduce the function of each program module of the embodiment.

As shown in FIG. 13, the system of generating data specifically includes the following components:

An obtaining module 201', is used for obtaining game data sent by the terminal device.

Exemplarily, with reference to FIG. 1, the server S obtains the game data sent by a plurality of terminal devices P1, P2 . . . Pn, and the game data includes state data of the terminal devices P1, P2 . . . Pn in a game state and a non-game state, actions performed and the reward values obtained by performing the actions.

An extracting module 202', is used for extracting a plurality of state features of the terminal device from the game data, wherein the plurality of the state features comprise state features of a plurality of time.

In an exemplary embodiment, the extracting module 202' further, is used for saving the game data in a segment replay buffer corresponding to the terminal device.

Exemplarily, the game data is stored in a corresponding segment replay buffer of the replay buffer according to a difference of the terminal devices, and the replay buffer includes a plurality of segment replay buffers. With reference to FIG. 1, when plurality of game data are respectively obtained from a plurality of terminal devices P1, P2 . . . Pn, the plurality of the data are stored in the segment replay buffers of the replay buffer according to the plurality of the terminal devices P1, P2 . . . Pn, so as to according to the different data generation speeds of the plurality of the terminal devices P1. P2 . . . Pn, the corresponding data is stored in segment in the replay buffer in a first-in-first-out order, which is beneficial to data maintenance. For example: the plurality of game data obtained from the terminal device P1 is stored in the segment replay buffer b1 corresponding to the terminal device P1.

The extracting module 202' further, is used for extracting the plurality of the state features of the terminal device from the segment replay buffer.

Exemplarily, in conjunction with FIG. 1, a plurality of state features of the terminal device P1 are extracted from the segment replay buffer b1 according to a preset rule. It should be noted that the plurality of the state features are state features of the terminal device P1 after the virtual object in the terminal device P1 performs each action within a preset period of time. Each state feature corresponds to a time.

A generating module 203', is used for generating a corresponding feature sequence according to a preset time and a state feature corresponding to the preset time.

Since the state feature corresponds to the preset time one-to-one, the preset time and the state feature corresponding to the preset time form one feature sequence.

The generating module 203' further, is used for inputting the feature sequence into a preset model to make the model generate a Q value corresponding to each action performed by a virtual object in the terminal device according to the feature sequence and a current state feature of the terminal device, wherein the model includes at least a first fully connected layer, a second fully connected layer, a LSTM network, and a third fully connected layer.

In an exemplary embodiment, since each target state feature in the feature sequence has a certain time sequence relationship, the generating module 203' further, is used for inputting each state feature into the LSTM network according to the time sequence relationship of the feature sequence, and obtains competition state information of other terminal devices with a competitive relationship with the terminal device through the LSTM network.

It should be noted that a time step of the LSTM network is set to 30 seconds in the game to capture most of macroscopic change information during the game.

Exemplarily, the working principle of the LSTM network can be as follows:

$$f_t = \sigma(W_{xf} * F_t + W_{hf} * \hat{H}_{t-1} + b_f)$$

$$g_t = \tan h(W_{xg} * F_t + W_{hg} * \hat{H}_{t-1} + b_g)$$

$$i_t = \sigma(W_{xi} * F_t + W_{hi} * \hat{H}_{t-1} + b_i)$$

$$C_t = f_t \sqcup \hat{C}_{t-1} + i_t \sqcup g_t$$

$$o_t = \sigma(W_{xo} * F_t + W_{ho} * \hat{H}_{t-1} + b_o)$$

$$H_t = o_t \sqcup \tan h(C_t)$$

A forgetting gate, is used to receive memory information and determine which part of the memory information to keep and forget;

wherein, the $f_t$ is a forgetting factor, $f_t \in [0,1]$, and the $f_t$ represents a selection weight of a target unit state information $\hat{C}_{t-1}$ at time t, wherein the target unit state information $\hat{C}_{t-1}$ is output at time t−1, the $f_t$ is used to determine whether to make the memory information (that is, the target unit state information $\hat{C}_{t-1}$ output and converted at time t−1) learned at time t−1 passed or partially passed.

An input gate, is used to select the information to be memorized;

the $i_t \in [0,1]$, and the $i_t$ represents a selection weight of a temporary unit state information $g_t$ at time t, and $g_t$ is the temporary unit state information at time t;

the $f_t \sqcup \hat{C}_{t-1}$ indicates information that is wished to delete, and the $i_t \sqcup g_t$ indicates newly added information, and the unit state information $C_t$ at time t can be obtained through the two parts of the $f_t \Box C_{t-1}$ and the $i_t \Box g_t$.

An output gate is used to output hidden state information at time t, wherein, the $o_t \in [0,1]$, and $o_t$ is the selection weight of the unit state information at time t.

It should be noted that, $W_{xf}$, $W_{hf}$, $W_{xg}$, $W_{hg}$, $W_{xi}$, $W_{hi}$, $W_{xo}$ and $W_{ho}$ are all weight parameters in the LSTM network; $b_f$, $b_g$, $b_i$ and $b_o$ are all bias items in the LSTM network; and the parameters are obtained through a model training.

It should be noted that the above exemplary structure of the LSTM network is not used to limit the scope of patent protection of the present invention.

The generating module 203' further, is used for inputting the competition state information and the current state feature into the third fully connected layer, and obtaining the Q value from the third fully connected layer.

Through the embodiments of the present invention, it is possible to effectively infer future state and rewards according to current partial observations during the game, so as to make a correct macro action selection.

Figure 14:
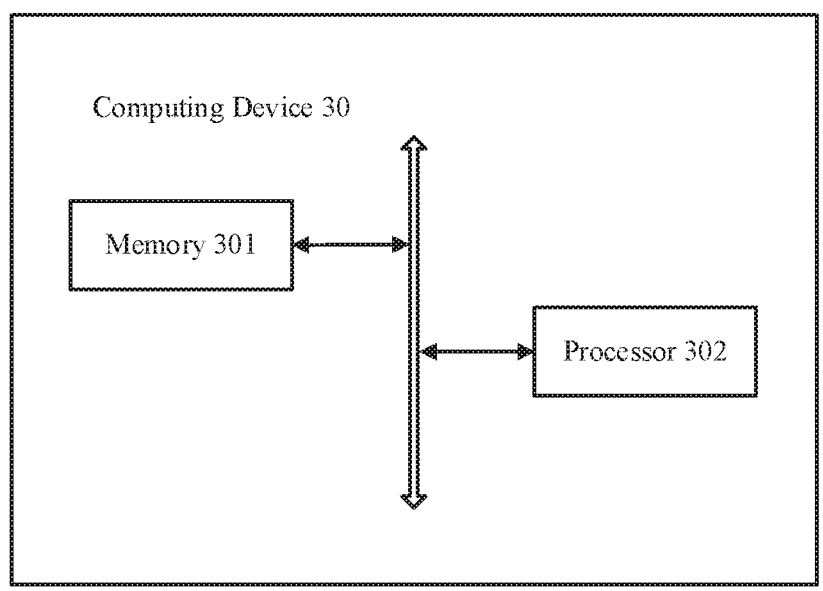
FIG. 14 illustrates an optional schematic diagram of hardware architecture of a computing device according to an embodiment of the present disclosure.

In an exemplary embodiment, the generating module 203' further is used for making the state feature pass through the first fully connected layer and the second fully connected layer in sequence, and obtains a target state feature corresponding to the preset time. The embodiment also provides a computing device, such as a smart phone, a tablet computer, a notebook computer, a desktop computer, a rack server, a blade server, a tower server, or a rack server (including a stand-alone server, or server cluster consisting of a plurality of servers), and so on. As shown in FIG. 14, the computing device 30 of the embodiment includes at least, but not limited to: a memory 301 and a processor 302 that can be communicatively connected to each other through a system bus. It should be noted that FIG. 14 only shows the computing device 30 having the components of the memory 301 and the processor 302, but it should be understood that not all components shown are required to be implemented, and more or fewer components may be implemented instead.

In the embodiment, the memory 301 (which is a readable storage medium) includes a flash memory, a hard disk, a multimedia card, a card-type memory (such as, SD or DX memory and so on), a Random Access Memory (RAM), a Static Random Access Memory (SRAM), a Read-Only Memory (ROM), an Electrically Erasable Programmable Read-only Memory (EEPROM), a Programmable Read-Only Memory (PROM), a magnetic memory, a magnetic disk, an optical disk and so on. In some embodiments, the memory 301 may be an internal storage unit of the computing device 30, such as a hard disk or a memory of the computing device 30. In other embodiments, the memory 301 may also be an external storage device of the computing device 30, such as a plug-in hard disk, a Smart Media Card (SMC), a Secure Digital (SD) card, a Flash Card and so on. Of course, the memory 301 may also include both the internal storage unit of the computing device 30 and its external storage device. In the embodiment, the memory 301 is generally used to store an operating system and various types of application software installed in the computing device 30, such as program codes of the server in the above embodiment. In addition, the memory 301 can also be used to temporarily store various types of data that have been output or will be output.

The processor 302 may be a Central Processing Unit (CPU), a controller, a microcontroller, a microprocessor, or other data processing chips in some embodiments. The processor 302 is generally used to control the overall operation of the computing device 30.

Specifically, in the embodiment, the processor 302 executes the programs of the method of training a model stored in the processor 302, and the following steps are implemented when the programs of the method of training a model are executed:

obtaining a plurality of game data from a plurality of terminal devices respectively;

taking a sample of the plurality of the game data according to a preset priority, and obtaining a sampling result;

inputting the sampling result into a preset loss function to train a model according to a calculation result of the loss function;

wherein, the plurality of the game data is stored in a replay buffer, the replay buffer includes a plurality of segment replay buffers, and the game data obtained from different terminal devices are stored in the segment replay buffers corresponding to the replay buffer.

For the specific embodiment process of the above method steps, please refer to the above embodiment, and the embodiment will not be repeated here.

The embodiment also provides a computing device, such as a smart phone, a tablet computer, a notebook computer, a desktop computer, a rack server, a blade server, a tower server, or a rack server (including a stand-alone server, or server cluster consisting of plurality of servers), and so on. As shown in FIG. 14, the computing device 30 of the embodiment includes at least, but not limited to: a memory 301 and a processor 302 that can be communicatively connected to each other through a system bus. It should be noted that FIG. 13 only shows the computing device 30 having the components of the memory 301 and the processor 302, but it should be understood that not all components shown are required to be implemented, and more or fewer components may be implemented instead.

In the embodiment, the memory 301 (which is a readable storage medium) includes a flash memory, a hard disk, a multimedia card, a card-type memory (such as, SD or DX memory and so on), a Random Access Memory (RAM), a Static Random Access Memory (SRAM), a Read-Only Memory (ROM), an Electrically Erasable Programmable Read-only Memory (EEPROM), a Programmable Read-Only Memory (PROM), a magnetic memory, a magnetic disk, an optical disk and so on. In some embodiments, the memory 301 may be an internal storage unit of the computing device 30, such as a hard disk or a memory of the computing device 30. In other embodiments, the memory 301 may also be an external storage device of the computing device 30, such as a plug-in hard disk, a Smart Media Card (SMC), and a Secure Digital (SD) card, a Flash Card and so on. Of course, the memory 301 may also include both the internal storage unit of the computing device 30 and its external storage device. In the embodiment, the memory 301 is generally used to store an operating system and various types of application software installed in the computing device 30, such as program codes of the terminal device in the above embodiment. In addition, the memory 301 can also be used to temporarily store various types of data that have been output or will be output.

The processor 302 may be a Central Processing Unit (CPU), a controller, a microcontroller, a microprocessor, or other data processing chips in some embodiments. The processor 302 is generally used to control the overall operation of the computing device 30.

Specifically, in the embodiment, the processor 302 is configured to execute the programs of the method of training a model stored in the processor 302, and the following steps are implemented when the programs of the method of training a model are executed:

obtaining model information synchronized by a server, and game data in a game state and target data in a non-game state of the terminal device, wherein the game data includes at least a state of a virtual environment when the terminal device is in the game state, the target data comprises at least an over state of the virtual environment when the terminal device is in the non-game state, an action in the non-game state, and a target reward value obtained after performing the action in the non-game state;

inputting the game data into the model to obtain a Q value of each action performed by a virtual object in the terminal device from the model;

determining the action performed by the virtual object in the terminal device according to a preset exploration degree and the Q value to make the virtual object perform the action, and obtaining a corresponding reward estimated value and the state of the virtual environment, wherein the exploration degree represents a credibility of performing the action corresponding to a maximum value of the Q value; and sending the action, the reward estimated value, the state, and the target data to the server, and storing the action, the reward estimated value, the state, and the target data in a segment replay buffer corresponding to a preset replay buffer, for the server to train and update the model.

The embodiment also provides a computer-readable storage medium, such as a flash memory, a hard disk, a multimedia card, a card-type memory (for example, SD or DX memory and so on), a Random Access Memory (RAM), a Static Random Access Memory (SRAM), a Read-Only Memory (ROM), an Electrically Erasable Programmable Read-only Memory (EEPROM), a Programmable Read-Only Memory (PROM), a magnetic memory, a magnetic disk, an optical disk, a server, an App Store and so on, which stores computer programs that upon, when the computer programs are executed by a processor, the following steps are implemented:

Obtaining a plurality of game data from a plurality of terminal devices respectively;

taking a sample of the plurality of the game data according to a preset priority, and obtaining a sampling result:

inputting the sampling result into a preset loss function to train a model according to a calculation result of the loss function;

wherein, the plurality of the game data is stored in a replay buffer, the replay buffer includes a plurality of segment replay buffers, and the game data obtained from different terminal devices are stored in the segment replay buffers corresponding to the replay buffer.

For the specific embodiment process of the above method steps, please refer to the above embodiment, and the embodiment will not be repeated here.

The embodiment also provides a computer-readable storage medium, such as a flash memory, a hard disk, a multimedia card, a card-type memory (for example, SD or DX memory and so on), a Random Access Memory (RAM), a Static Random Access Memory (SRAM), a Read-Only Memory (ROM), an Electrically Erasable Programmable Read-only Memory (EEPROM), a Programmable Read-Only Memory (PROM), a magnetic memory, a magnetic disk, an optical disk, a server, an App Store and so on, which stores computer programs that upon, when the computer programs are executed by a processor, the following steps are implemented:

obtaining model information synchronized by a server, and game data in a game state and target data in a non-game state of the terminal device, wherein the game data includes at least a state of a virtual environment when the terminal device is in the game state, the target data comprises at least an over state of the virtual environment when the terminal device is in the non-game state, an action in the non-game state, and a target reward value obtained after performing the action in the non-game state;

inputting the game data into the model to obtain a Q value of each action performed by a virtual object in the terminal device from the model;

determining the action performed by the virtual object in the terminal device according to a preset exploration degree and the Q value to make the virtual object perform the action, and obtaining a corresponding reward estimated value and the state of the virtual environment, wherein the exploration degree represents a credibility of performing the action corresponding to a maximum value of the Q value: and sending the action, the reward estimated value, the state, and the target data to the server, and storing the action, the reward estimated value, the state, and the target data in a segment replay buffer corresponding to a preset replay buffer, for the server to train and update the model.

The computing device and readable storage medium provided in the present invention, obtains game data in a game state and target data in a non-game state from a plurality of terminal devices, takes a sample of the game data and the target data according to a preset priority, and inputs a sampling result into a loss function to train a model, so as to achieve an effect of fully training the model in the case of sparse rewards, greatly improve a robot performance.

It should be noted that in this article, the terms "including", "comprising" or any other variants thereof are intended to cover non-exclusive inclusion, so that a process, a method, an article or a device including a series of elements not only includes those elements, also includes other elements not explicitly listed, or elements inherent to the process, method, article, or device. If there are no more restrictions, the element defined by the sentence "including a . . . " does not exclude the existence of other same elements in the process, method, article or device that includes the element.

The sequence numbers of the above embodiments of the present invention are for description only, and do not represent advantages and disadvantages of the embodiments.

Through descriptions of the above embodiments, those skilled in the art can clearly understand that the methods in the above embodiments can be implemented by means of software plus a necessary general hardware platform, and of course, can also be implemented by hardware, but in many cases the former is a better implementation.

The above are only preferred embodiments of the present invention and do not limit the patent scope of the present invention. Any equivalent structure or equivalent process transformation made by the description and drawings of the present invention, or directly or indirectly used in other related technical fields, are as same reason included in the scope of patent protection of present invention.

What is claimed is:

1. A method, comprising:
   obtaining a plurality of sets of game data from a plurality of terminal devices, respectively, wherein the plurality of sets of game data are stored in a plurality of segment replay buffers, respectively;

sampling the plurality of sets of game data based on a predetermined priority and obtaining a sampling result;
inputting the sampling result into a loss function and training a model by using a calculation result of the loss function; and
determining a quality (Q) value of each action performed by a virtual object in a game run on a terminal device among the plurality of terminal devices by using the model.

2. The method of claim 1, wherein a formula of the loss function is as follows:

$$l_t(\theta) = \frac{1}{2}(G_t - q(S_t, A_t, \theta))^2;$$

$$G_t = \lambda^n q\left(S_{t+n}, \underset{a}{\operatorname{argmax}}\, q(S_{t+n}, a, \theta), \theta^-\right);$$

wherein $l_t(\theta)$ represents the loss function, $S_t$ represents a state at time t, $A_t$ represents an action at time t, $G_t$ represents target data when a game is not over, t represents a sampling time index beginning at the state $S_t$ and the action $A_t$, $\theta$ represents a parameter used for an action selection, $\theta$ changes with training, n represents a number of actions performed, $\lambda$ is a constant, $0<\lambda<1$, $S_{t+n}$ represents a state after n actions are performed after the time t, and $\alpha$ represents the action performed, $\theta^-$ represents a parameter copied from $\theta$ by cycle.

3. The method of claim 1, further comprising:
obtaining data from the terminal device;
extracting a plurality of state features from the data, the plurality of the state features corresponding to a plurality of time points during a predetermined time period; and
generating a feature sequence based on the plurality of time points and the plurality of the state features corresponding to the plurality of time points.

4. The method of claim 3, further comprising:
inputting the feature sequence into the model; and
determining the Q value of each action performed by the virtual object by using the model based on the feature sequence and a current state feature associated with the terminal device.

5. The method of claim 1, wherein each of the plurality of terminal devices is assigned to a corresponding number, and a plurality of exploration degrees corresponding to the plurality of terminal devices are determined by a formula:

$$\epsilon_i = \epsilon^{1+\frac{i}{N-1}\alpha};$$

wherein $\epsilon$, $\alpha$, and N are constants, i represents a corresponding number assigned to each of the plurality of terminal devices, a higher exploration degree represents a lower probability of performing an action corresponding to a maximum value among the Q value of each action, and a lower exploration degree represents a higher probability of performing the action corresponding to a maximum value among the Q value of each action.

6. The method of claim 1, further comprising:
determining an action to be performed by the virtual object based on a predetermined exploration degree and the Q value;
performing the determined action by the virtual object; and
obtaining an estimated reward value and a state of a virtual environment corresponding to performing the determined action.

7. The method of claim 6, further comprising:
storing data indicative of the determined action, the estimated reward value, the state of the virtual environment in a corresponding segment replay buffer among the plurality of segment replay buffers; and
further training and updating the model using the data.

8. The method of claim 1, wherein a reward value corresponding to the game run on the terminal device is determined by a formula:

$$r_{new} = \gamma^{timedecat}\,\frac{S_{our} - S_{enemy}}{\max(S_{our}, S_{enemy})};$$

wherein $r_{new}$ represents the reward value associated with the terminal device, timedecay represents a game duration, $\gamma$ is a constant, $0<\gamma<1$, $\gamma^{timedecay}$ represents the longer the game duration the smaller a value of the constant, $S_{our}$ represents a score associated with the terminal device, and $S_{enemy}$ represents scores associated with other terminal devices having a confrontational relationship with the terminal device.

9. A system, comprising:
at least one processor; and
at least one memory communicatively coupled to the at least one processor and storing instructions that upon execution by the at least one processor cause the system to:
obtain a plurality of sets of game data from a plurality of terminal devices, respectively, wherein the plurality of sets of game data are stored in a plurality of segment replay buffers, respectively;
sample the plurality of sets of game data based on a predetermined priority and obtain a sampling result;
input the sampling result into a loss function and training a model by using a calculation result of the loss function; and
determine a quality (Q) value of each action performed by a virtual object in a game run on a terminal device among the plurality of terminal devices by using the model.

10. The system of claim 9, wherein a formula of the loss function is as follows:

$$l_t(\theta) = \frac{1}{2}(G_t - q(S_t, A_t, \theta))^2;$$

$$G_t = \lambda^n q\left(S_{t+n}, \underset{a}{\operatorname{argmax}}\, q(S_{t+n}, a, \theta), \theta^-\right);$$

wherein $l_t(\theta)$ represents the loss function, $S_t$ represents a state at time t, $A_t$ represents an action at time t, $G_t$ represents target data when a game is not over, t represents a sampling time index beginning at the state $S_t$ and the action $A_t$, $\theta$ represents a parameter used for an action selection, $\theta$ changes with training, n represents a number of actions performed, $\lambda$ is a constant, $0<\lambda<1$, $S_{t+n}$ represents a state after n actions are performed after the time t, and $\alpha$ represents the action performed, $\theta^-$ represents a parameter copied from $\theta$ by cycle.

11. The system of claim 9, the at least one memory further storing instructions that upon execution by the at least one processor cause the system to:
obtain data from the terminal device;
extract a plurality of state features from the data, the plurality of the state features corresponding to a plurality of time points during a predetermined time period; and
generate a feature sequence based on the plurality of time points and the plurality of the state features corresponding to the plurality of time points.

12. The system of claim 11, the at least one memory further storing instructions that upon execution by the at least one processor cause the system to:
input the feature sequence into the model; and
determine the Q value of each action performed by the virtual object by using the model based on the feature sequence and a current state feature associated with the terminal device.

13. The system of claim 9, wherein each of the plurality of terminal devices is assigned to a corresponding number, and a plurality of exploration degrees corresponding to the plurality of terminal devices are determined by a formula:

$$\epsilon_i = \epsilon^{1+\frac{i}{N-1}\alpha};$$

wherein $\epsilon$, $\alpha$, and N are constants, i represents a corresponding number assigned to each of the plurality of terminal devices, a higher exploration degree represents a lower probability of performing an action corresponding to a maximum value among the Q value of each action, and a lower exploration degree represents a higher probability of performing the action corresponding to a maximum value among the Q value of each action.

14. The system of claim 9, the at least one memory further storing instructions that upon execution by the at least one processor cause the system to:
determine an action to be performed by the virtual object based on a predetermined exploration degree and the Q value;
perform the determined action by the virtual object; and
obtain an estimated reward value and a state of a virtual environment corresponding to performing the determined action.

15. The system of claim 14, the at least one memory further storing instructions that upon execution by the at least one processor cause the system to:
store data indicative of the determined action, the estimated reward value, the state of the virtual environment in a corresponding segment replay buffer among the plurality of segment replay buffers; and
further train and update the model using the data.

16. The system of claim 9, wherein a reward value corresponding to the game run on the terminal device is determined by a formula:

$$r_{new} = \gamma^{timedecay} \frac{S_{our} - S_{enemy}}{\max(S_{our}, S_{enemy})};$$

wherein $r_{new}$ represents the reward value associated with the terminal device, timedecay represents a game duration, $\gamma$ is a constant, $0<\gamma<1$, $\gamma^{timedecay}$ represents the longer the game duration the smaller a value of the constant, $S_{our}$ represents a score associated with the terminal device, and $S_{enemy}$ represents scores associated with other terminal devices having a confrontational relationship with the terminal device.

17. A non-transitory computer-readable storage medium, storing computer-readable instructions that upon execution by a processor cause the processor to implement operations comprising:
obtaining a plurality of sets of game data from a plurality of terminal devices, respectively, wherein the plurality of sets of game data are stored in a plurality of segment replay buffers, respectively;
sampling the plurality of sets of game data based on a predetermined priority and obtaining a sampling result;
inputting the sampling result into a loss function and training a model by using a calculation result of the loss function; and
determining a quality (Q) value of each action performed by a virtual object in a game run on a terminal device among the plurality of terminal devices by using the model.

18. The non-transitory computer-readable storage medium of claim 17, wherein a formula of the loss function is as follows:

$$l_t(\theta) = \frac{1}{2}(G_t - q(S_t, A_t, \theta))^2;$$

$$G_t = \lambda^n q\left(S_{t+n}, \genfrac{}{}{0pt}{}{\operatorname{argmax}}{a} q(S_{t+n}, a, \theta), \theta^-\right);$$

wherein $l_t(\theta)$ represents the loss function, $S_t$ represents a state at time t, $A_t$ represents an action at time t, $G_t$ represents target data when a game is not over, t represents a sampling time index beginning at the state $S_t$ and the action $A_t$, $\theta$ represents a parameter used for an action selection, $\theta$ changes with training, n represents a number of actions performed, $\lambda$ is a constant, $0<\lambda<1$, $S_{t+n}$ represents a state after n actions are performed after the time t, and $a$ represents the action performed, $\theta^-$ represents a parameter copied from $\theta$ by cycle.

19. The non-transitory computer-readable storage medium of claim 17, the operations further comprising:
obtaining data from the terminal device;
extracting a plurality of state features from the data, the plurality of the state features corresponding to a plurality of time points during a predetermined time period;
generating a feature sequence based on the plurality of time points and the plurality of the state features corresponding to the plurality of time points;
inputting the feature sequence into the model; and
determining the Q value of each action performed by the virtual object by using the model based on the feature sequence and a current state feature associated with the terminal device.

20. The non-transitory computer-readable storage medium of claim 17, the operations further comprising:
determining an action to be performed by the virtual object based on a predetermined exploration degree and the Q value;

performing the determined action by the virtual object;
obtaining an estimated reward value and a state of a virtual environment corresponding to performing the determined action;
storing data indicative of the determined action, the estimated reward value, the state of the virtual environment in a corresponding segment replay buffer among the plurality of segment replay buffers; and
further training and updating the model using the data.

* * * * *